United States Patent [19]
Streit et al.

[11] Patent Number: 5,774,824
[45] Date of Patent: Jun. 30, 1998

[54] MAP-MATCHING NAVIGATION SYSTEM

[75] Inventors: Donald A. Streit, State College; Brian J. Gilmore, Centre Hall; Min Lu, Harrisburg; Michael A. Pusateri, State College, all of Pa.

[73] Assignee: The Penn State Research Foundation, University Park, Pa.

[21] Appl. No.: 518,639

[22] Filed: Aug. 24, 1995

[51] Int. Cl.[6] .......................... G06F 165/00; G08G 1/123
[52] U.S. Cl. .................. 701/207; 701/209; 701/210; 701/217; 340/990; 340/995
[58] Field of Search ............... 364/444.1, 444.2, 364/447, 449.1, 449.3, 449.6, 450, 449.4; 340/990, 995, 988; 701/201, 202, 205, 207, 209, 212, 217, 210

[56] References Cited

U.S. PATENT DOCUMENTS

| | | | |
|---|---|---|---|
| 4,774,671 | 9/1988 | Itoh et al. .............................. | 364/449 |
| 4,774,672 | 9/1988 | Tsunoda et al. ....................... | 364/449 |
| 4,879,658 | 11/1989 | Takashima et al. ................... | 364/449 |
| 4,888,699 | 12/1989 | Knoll et al. ............................ | 364/449 |
| 4,937,751 | 6/1990 | Nimura et al. ......................... | 364/449 |
| 4,970,652 | 11/1990 | Nagashima ............................. | 364/449 |
| 4,989,151 | 1/1991 | Nuimura ................................ | 364/449 |
| 5,016,007 | 5/1991 | Iihoshi et al. .......................... | 340/995 |
| 5,031,104 | 7/1991 | Ikeda et al. ............................ | 364/449.3 |
| 5,046,011 | 9/1991 | Kakihara et al. ...................... | 364/449 |
| 5,060,162 | 10/1991 | Ueyama et al. ........................ | 364/449 |
| 5,119,301 | 6/1992 | Shimizu et al. ........................ | 364/450 |
| 5,177,685 | 1/1993 | Davis et al. ............................ | 364/443 |
| 5,262,775 | 11/1993 | Tamai et al. ........................... | 340/995 |
| 5,278,424 | 1/1994 | Kagawa ................................. | 250/561 |
| 5,283,575 | 2/1994 | Kao et al. .............................. | 340/990 |
| 5,311,173 | 5/1994 | Komura et al. ........................ | 340/995 |
| 5,311,195 | 5/1994 | Mathis et al. .......................... | 342/357 |
| 5,345,382 | 9/1994 | Kao ....................................... | 364/457 |
| 5,394,333 | 2/1995 | Kao ....................................... | 364/450 |
| 5,398,188 | 3/1995 | Maruyama ............................. | 364/449 |
| 5,450,343 | 9/1995 | Yurimoto et al. ..................... | 364/449.2 |
| 5,473,324 | 12/1995 | Ueno ..................................... | 340/990 |
| 5,486,822 | 1/1996 | Tenmoku et al. ...................... | 340/995 |
| 5,508,931 | 4/1996 | Snider ................................... | 364/449.1 |

*Primary Examiner*—Tan Q. Nguyen
*Attorney, Agent, or Firm*—Thomas J. Monahan

[57] ABSTRACT

A map matching navigation system for monitoring vehicle state characteristics including the location of a vehicle on a map route. The map matching navigation system may operate in a fixed mode wherein the map route is inputted by a user or a flexible mode wherein the map matching navigation system determines the map route from a plurality of measured points which correspond to the location of the vehicle. The map matching navigation system additionally updates the location of the vehicle at a plurality of positions on the map route wherein the vehicle location is known with an increased level of confidence.

26 Claims, 6 Drawing Sheets

MAP-MATCHING NAVIGATION SYSTEM

BACKGROUND OF THE INVENTION

This invention relates to navigation systems and more particularly to navigation systems which utilize map matching for determining a route of travel and the location of a vehicle on the route of travel.

Map matching systems were introduced to imitate and automate the working procedures of traditional navigational systems. In particular, map matching systems generally input position and heading data from other locating subsystems which include dead reckoning (DR) systems, global positioning systems (GPS) and inertial navigation systems (INS). The map matching systems compare the time history of the input data (i.e. vehicle path) with the map route data in the map database. The map matching systems then determine which map route the vehicle is traveling on and subsequently match the measured position and heading onto the appropriate map route.

The map route data contained within the map database is vital for a successful map matching system. Therefore, one data source alone is usually not sufficient to achieve the required level of accuracy. Several sources should be utilized to compile a database and thereby eliminate insufficient, inaccurate, or obsolete data.

Map matching systems may be used in many navigation applications. First, it may be used to provide vehicle position on a display within a car thereby enabling the driver to determine the current position of the vehicle and plot a route to reach the destination. The map matching system may provide minimal information such as direction and air-line distance to a destination or detailed step-by-step route guidance instructions for reaching a destination.

In addition, the individual vehicles may transmit navigation information to a dispatch center for monitoring. Therefore, dispatchers may benefit from map matching systems inasmuch as they may simultaneously know the location of numerous vehicles at any time. The map matching system may also be used in public transportation systems to inform passengers of arrival times and location of the vehicle on the vehicle route.

Map matching systems must be able to search and manipulate large amounts of map data to provide real time location information. However, the systems are much more efficient if the vehicle is traveling along a predetermined route inasmuch as only map data along the route is relevant to the navigation determinations and the size of the "active" map is greatly reduced. The predetermined route technique is applicable to systems wherein the vehicles move along a fixed route. However, this technique may also be extended to more advanced applications such as route planning and route guidance systems.

Traditional map matching systems have been found to include numerous sources of error including approximation error, navigation error, and positioning error. Therefore, the error in such a map matching navigation system would grow unboundedly unless it is periodically reduced throughout the monitoring of a vehicle along a map route.

There is a need for a map matching navigation system which utilizes map matching for automatically determining vehicle state characteristics in real time. Therefore, the map matching navigation system must be able to efficiently search and manipulate large amounts of data to provide realistic and useful assistance in a flexible navigation mode. In addition, the map matching navigation system must also be able to navigate predetermined route applications wherein the vehicles travels along a fixed route. Furthermore, the map matching navigation system must reduce error which accumulates in the navigator sub-system to provide accurate navigation information.

SUMMARY OF THE INVENTION

The invention provides a map matching navigation system which may operate in a fixed mode or a flexible mode and continuously reduces accumulated error in the system to provide accurate vehicle state information.

The map matching navigation system in accordance with the present invention includes a map database including a plurality of links and a plurality of nodes for defining a map route within a geographical area. The map matching navigation system may additionally include a sensor and a navigator for determining a measured point of the vehicle.

The map matching navigation system further includes a correlator coupled with the navigator for determining a matched point on the map route which corresponds to the measured point. In addition, the map matching navigation system may include an analyzer coupled with the correlator for updating the measured point and the matched point to the end of a curve after the vehicle has reached the end of the curve.

The map matching navigation system may further include a map route processor for determining the route being travelled upon by the vehicle. The map route processor may utilize one or more statistical parameters based upon the measured points and matched points for determining the appropriate route.

The system preferably includes a user interface coupled with the map route processor for conveying the map route and the matched point thereon to a user. In addition, the user interface may be utilized for inputting the initial vehicle location and a predetermined map route, if the map matching navigation system is operating as a fixed navigator, into the system.

A preferred embodiment of the invention will be described hereinafter with reference to the enclosed drawings.

DETAILED DESCRIPTION OF THE PREFERRED EMBODIMENTS

The accurate operation of the map matching navigation system depends in large part upon the accuracy of the map database 14. Therefore, the map database 14 utilized by the system should be the product of numerous data sources to provide an accurate, current and complete map database 14.

The map database 14 utilized by the map matching navigation system according to the invention may be a two dimensional model. All map routes in such a map database 14 are one-way roads. Therefore, all two-way roads are modeled as two one-way roads. The map database 14 may be stored in a CD ROM, cassette or other computer readable memory 16. Accordingly, the map database 14 may be easily updated and the map databases 14 may be changed depending upon the geographical location of the vehicle 4.

Figure 1:
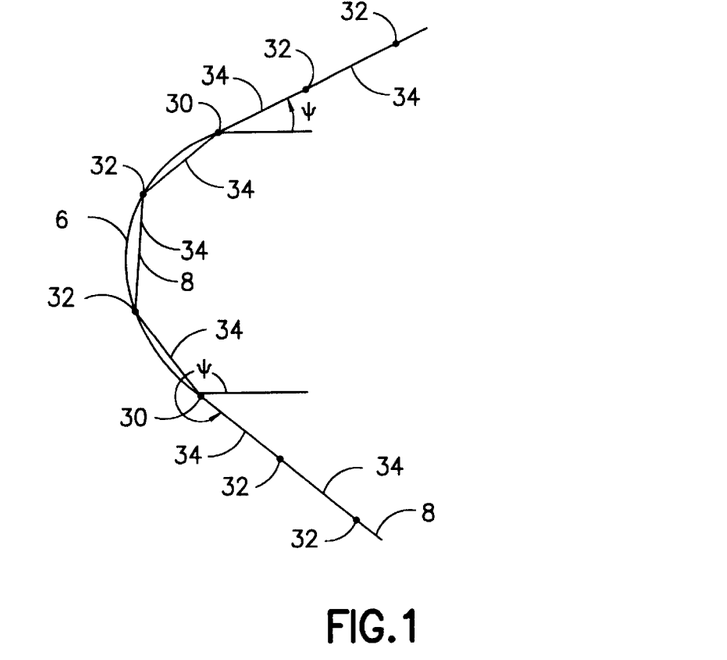
FIG. 1 is a schematic of a curved portion of the map route.

The map routes modeled within the map database 14 include basic map elements such as a plurality of key nodes 30, shaping nodes 32 and links 34 as shown in FIG. 1. Road intersections and bus stops can be modelled as key nodes 30 while shaping nodes 32 define curves in the road and model long straight road segments which are devoid of intersections and bus stops. The straight lines which connect the nodes represent road segments and are defined as links 34.

The approximation accuracy of curves in the map database increases with the number of shaping nodes 32. The basic attributes of the nodes can include x, y and z coordinates and yaw angles which may be measured counterclockwise with respect to the east. The basic attributes of the links 34 are distance and direction.

The map matching navigation system according to the invention may operate in two modes. In a first mode, the map matching navigation system operates as a flexible navigator. The map matching navigation system in this mode calculates the map route 8 of the vehicle 4 based upon a plurality of measured points 26.

The map matching navigation system may operate as a fixed navigator in a second mode wherein the system calculates the position of the vehicle 4 on the predetermined map route 8. The predetermined map route 8 may be inputted by a user into the map matching navigation system via a user interface 18 such as a keyboard, graphical screen or personal computer MIA slot.

The map matching navigation system may utilize a variety of methods for measuring the location of the vehicle 4 on the map route 8. The system preferably includes a sensor 10 for determining the distance travelled and azimuthal direction if a dead reckoning (DR) navigation system is utilized.

Additionally, the sensor 10 may include at least one accelerometer and at least one gyroscope if an inertial navigation system (INS) is used. The sensor 10 may further include a global positioning system receiver if a global positioning system (GPS) is utilized. In addition, the sensor 10 may include a tag receiver, such as a transponder read device, for receiving vehicle state information from a plurality of tags, such as transponders, adjacent the actual route 6.

An initialization function must be performed if a relative navigation system is used. The operator of the vehicle 4 may input the initialization information (e.g. initial position and heading) via a user interface 18. Alternatively, the intialization information may be automatically inputted into the map matching navigation system via an automatic tag system or a global positioning system.

Figure 2:
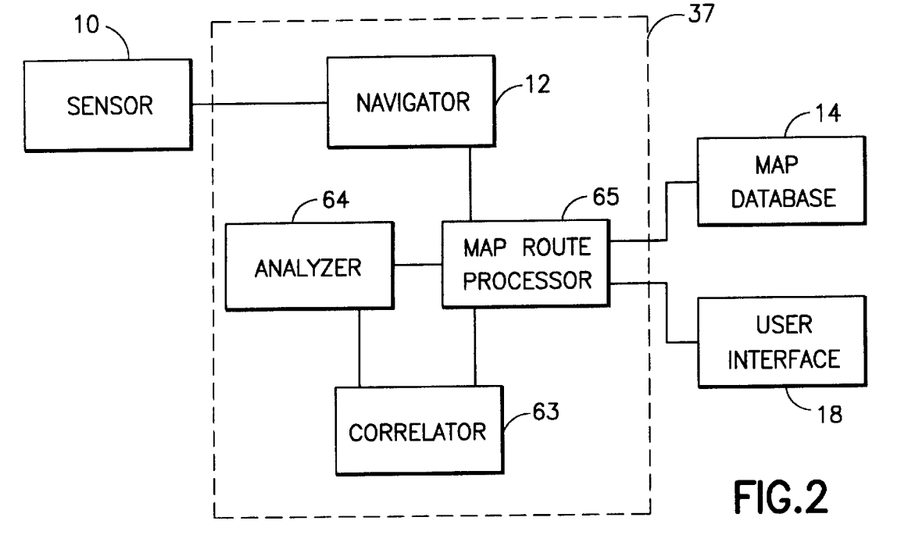
FIG. 2 is a functional block diagram of the map matching navigation system according to the invention.

A functional block diagram of the entire map matching navigation system is shown in FIG. 2. The individual functions are described in detail following the overall description of the system in relation to FIG. 2.

The sensor 10 provides vehicle state information which is forwarded to a navigator 12. The navigator 12 calculates a measured point 26 of the vehicle 4 based upon the vehicle state information. A map route processor 65 determines the appropriate portion of the map route 8 which corresponds to the measured point 26. A correlator 63 receives the measured point 26 and map route 8 information from the map route processor 65 and the correlator 63 subsequently determines a matched point 28 on the map route 8 which corresponds to the measured point 26.

An analyzer 64 simultaneously detects curves in the map route 8 which exceed a threshold value. The map matching navigation system updates the measured point 26 and the matched point 28 with the last key node 30 of the curve as the vehicle 4 exits the curve. Updating the measured point 26 and the matched point 28 with the end of the curve reduces accumulated error within the map matching navigation system because the position of the vehicle 4 is known with a high degree of certainty as it exits the curve. The map route 8 and matched point 28 may be conveyed to an operator of the vehicle 4 via the user interface 18.

In addition, the user may input a predetermined map route 8 via the user interface 18 if the map matching navigation system is operating as a fixed navigator. The predetermined route may be stored in a computer readable memory 16 as shown in FIG. 3.

The map route processor 65 determines the current link 35 on which the vehicle 4 is travelling from the plurality of measured points 26. In addition, the map route processor 65 may also determine the appropriate map route 8 through an analysis of the measured points 26 and the map database 14.

The navigator 12, correlator 63, analyzer 64 and the map route processor 65 may be implemented in a central processor 37 on board the vehicle 4. In addition, the central processor 37 utilize a working RAM 21 to perform map matching functions.

Figure 3:
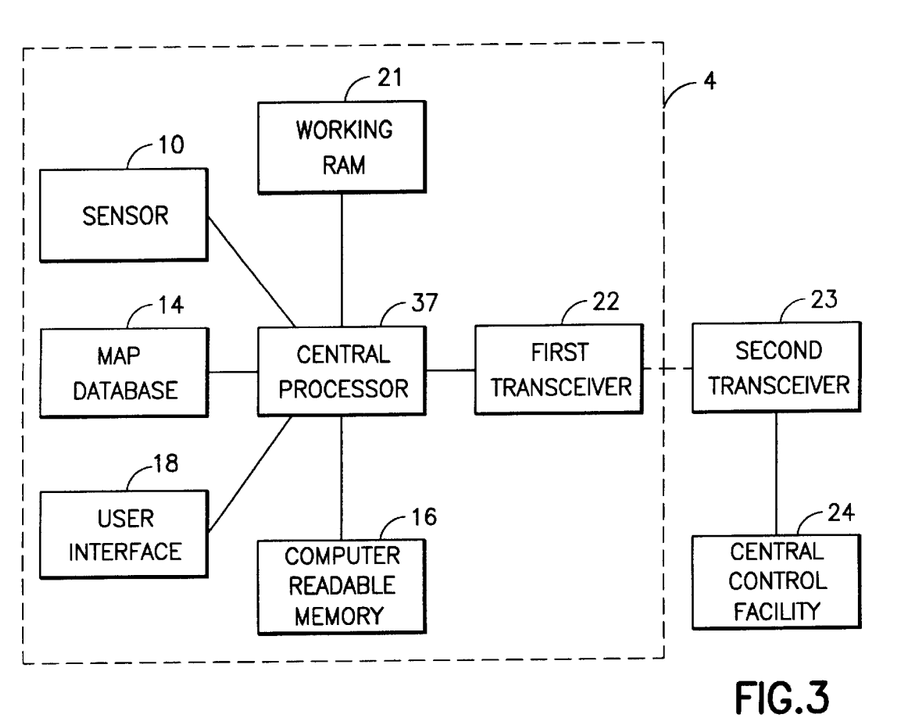
FIG. 3 is a functional block diagram of the map matching navigation system and a central control facility.

As depicted in FIG. 3, the map matching navigation system may further include a first transceiver 22 for transmitting vehicle position information to a central control facility 24 or a similar vehicle monitoring facility, and receiving route information or other communications from the central control facility 24 or other remote positions. The central control facility 24 may be present for monitoring a plurality of vehicles 4 equipped with the map matching navigation system according to the invention.

Figure 4:
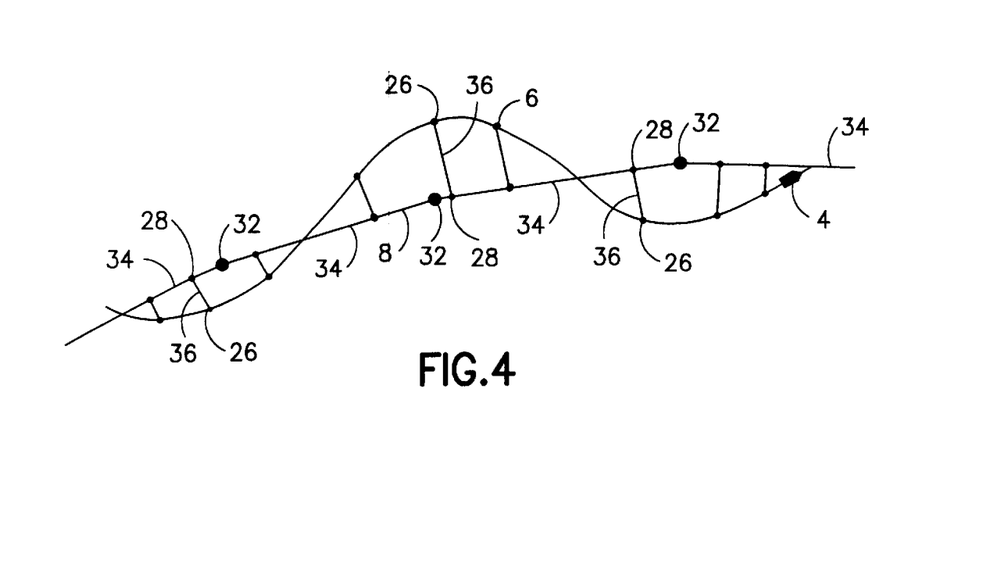
FIG. 4 is a schematic of a plurality of nodes and a plurality of links used to model an actual route.

As shown in FIG. 4, the locus of measured points 26 from the navigator 12 will deviate from a map route 8 due to numerous sources of error including approximation error, digitization error, database error and sensor error.

Figure 5:
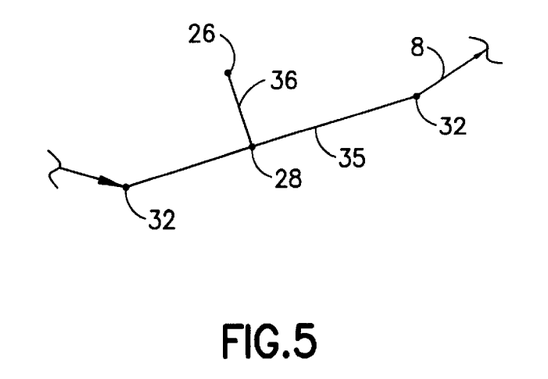
FIG. 5 is a schematic of a measured point adjacent to a portion of the map route and a corresponding matched point on the map route.

For map matching, each measured point 26 should have a corresponding matched point 28 along the map route 8. The matched point 28 preferably represents the vehicle's real position with the highest probability. As shown in FIG. 5, a point along the link 34 with the smallest distance to the measured point 26 is the point having the smallest contour of equal probability and most probable position of the matched point 28.

The matched point 28 may be represented by Cartesian coordinates which are calculated by the following equations:

$$x' = \frac{(x_i - x_{i+1})^2 x_{in} - (y_{i+1} - y_i)(x_i - x_{i+1})y_{in} - (y_{i+1} - y_i)(x_{i+1}y_i)(x_{i+1}y_i - x_iy_{i+1})}{(y_{i+1} - y_i)^2 + (x_i - x_{i+1})^2}$$

$$y' = \frac{(y_{i+1} - y_i)(x_i - x_{i+1})x_{in} + (y_{i+1} - y_i)^2 y_{in} - (x_i - x_{i+1})(x_{i+1}y_i - x_iy_{i+1})}{(y_{i+1} - y_i)^2 + (x_i - x_{i+1})^2}$$

Thus, the map matching navigation system may estimate the location of a vehicle 4 on a map route 8 despite deviations between the map route 8 and the set of measured points 26.

As shown in FIG. 5, the deviation of the map route 8 from an actual route 6 at one point may be represented by the deviation distance 36 from the measured point 26 to the matched point 28. The signed deviation distance 36 from each measured point 26 to its corresponding matched point 28 may be calculated from the following equation:

$$d = -\frac{(y_{i+1} - y_i)x_{in} + (x_i - x_{i+1})y_{in} + (x_{i+1}y_i - x_iy_{i+1})}{\sqrt{(y_{i+1} - y_i)^2 + (x_{i+1} - x_i)^2}}$$

Random variables and statistical parameters may be introduced to represent the degree of deviation of the map route 8 from the actual route 6. The degree of deviation may be estimated by obtaining a plurality of deviation distances 36 for a plurality of measured points 26. The mean distance deviation $\bar{d}$ and sample variance s may be calculated from the history of individual deviation distances 36:

$$\bar{d} = \frac{\sum_{i=1}^{n} d_i}{n}$$

$$s = \sqrt{\frac{\sum_{i=1}^{n} (d_i - \bar{d})^2}{n}}$$

The mean distance deviation $\bar{d}$ for a particular map route 8 should be approximately zero if the vehicle 4 is moving along the map route 8. However, the sample variance s should be quite large even if the mean distance deviation $\bar{d}$ is around zero. Therefore, the mean distance deviation d and the sample variance s statistically indicate the closeness between the plurality of measured points 26 on the actual route 6 and the map route 8.

These statistical parameters may be utilized to identify the specific map route 8 on which the vehicle 4 is travelling from a plurality of candidate routes 9. In addition, the heading of the vehicle 4 provides important information about the current location of the vehicle 4, especially when the vehicle 4 is approaching an intersection having numerous candidate routes 9 as shown in FIG. 6a.

Figure 6A:
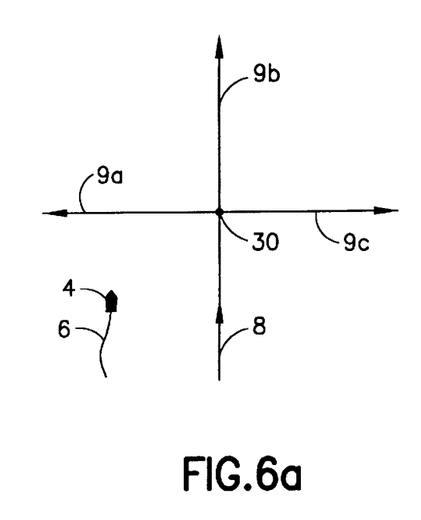
FIGS. 6a, 6b are schematic diagrams of a key node at an intersection.

The map route processor 65 of the map matching navigation system will retrieve specific data from the map database 14 regarding candidate routes 9a–9c as the vehicle 4 approaches an intersection as shown in FIG. 6a. The correlator 63 of the system monitors the vehicle position with respect to each candidate route 9a–9c until the appropriate map route 8 is identified and the other candidate routes 9a–9c are discarded.

Figure 6B:
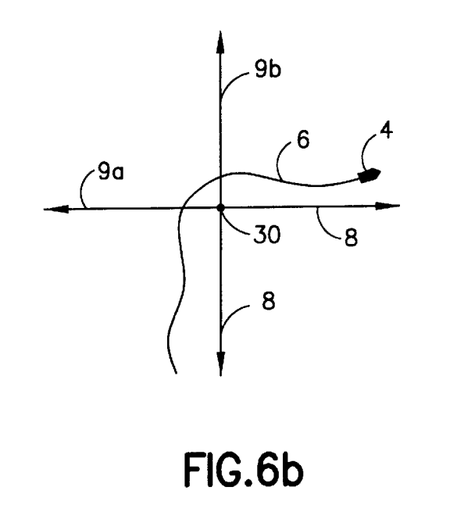

As shown in FIG. 6a, the heading of the vehicle 4 before it makes a turn is very close to that of a current map route 8. The heading of the vehicle 4 after a turn is very close to that of a first candidate route 9c as shown in FIG. 6b.

A correlation characteristic may be defined to collectively represent the degree of matching between the plurality of measured points 26 from the actual route 6 and the plurality of matched points 28 on the map route 8. The correlation characteristic is composed of two components including a heading component ($C_{heading}$) and a distance component ($C_{distance}$) and is defined by the following equation wherein $W_1$ and $W_2$ are weighting factors and $W_1 + W_2 = 1$:

$$C = (W_1 * C_{heading}) + (W_2 * C_{distance})$$

The components are defined by the following equations wherein $|\Delta\Psi| = |\Psi_{vehicle} - \Psi_{map}|$ (the heading deviation from the map route 8), and $\Psi = \pi$ (the maximum allowable heading deviation), and D is the maximum allowable lateral distance deviation and S is the maximum allowable sample variance:

$$C_{heading} = 1 - \frac{|\Delta\psi|}{\psi}$$

$$C_{distance} = \left(1 - \frac{|\bar{d}|}{D}\right)\left(1 - \frac{s}{S}\right)$$

The correlation characteristic is around 1 for good matching and less than one for poor matching.

The correlation characteristics may be utilized by the map matching navigation system functioning as a flexible navigator to determine which particular map route 8 the vehicle 4 is travelling upon when there is a plurality of candidate routes connected to a single key node 30 as shown in FIG. 6a.

In particular, the correlation characteristic will decrease quickly for non-matching candidate routes 9a, 9b of FIG. 6b as the vehicle 4 turns right and proceeds on the candidate route 9c. The candidate routes 9a, 9b need not be tracked and may be discarded after the correlation characteristic drops below a predetermined threshold value.

Figure 7:
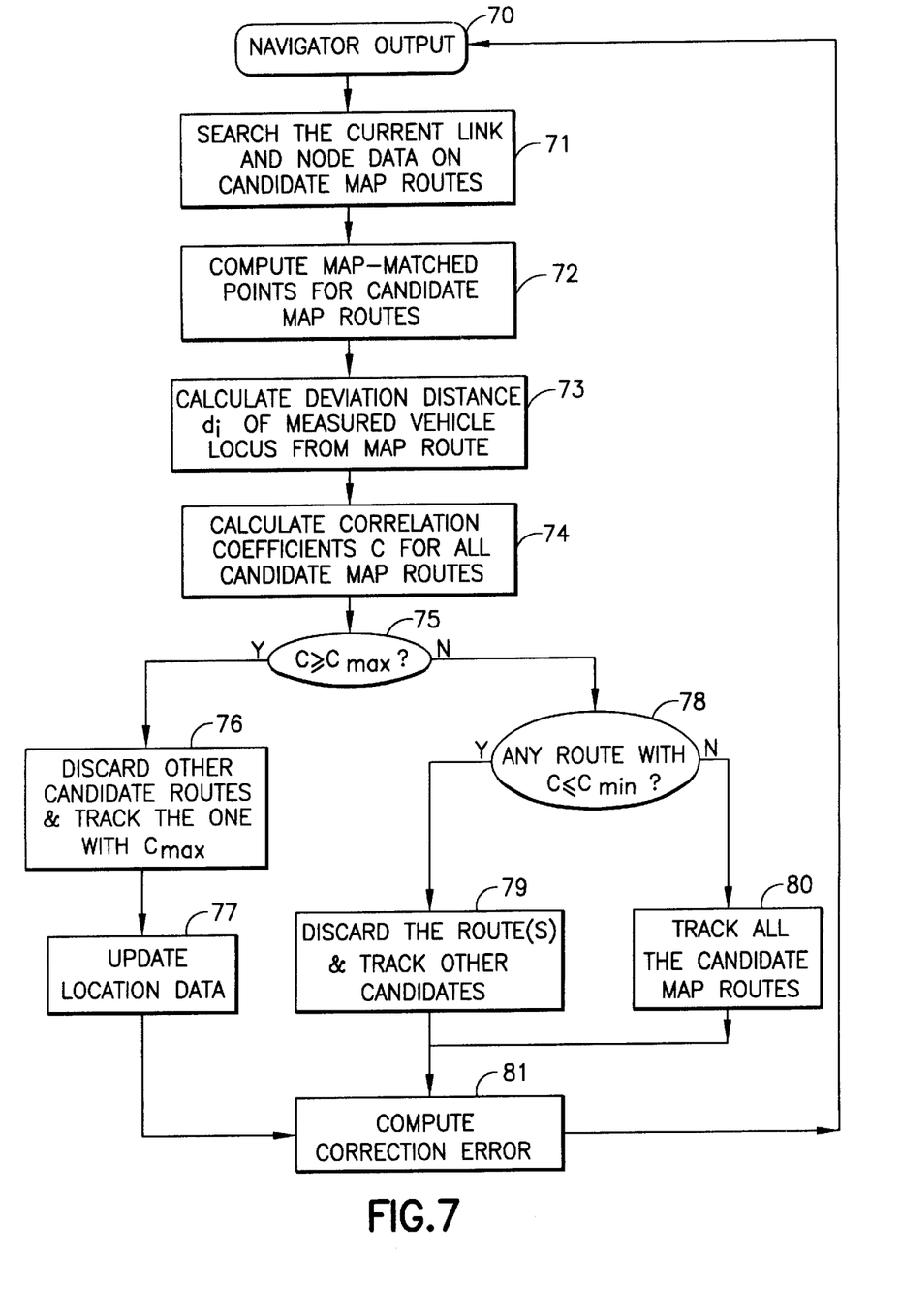
FIG. 7 is a flowchart of the process performed by the map matching navigation system for identifying the map route from a plurality of candidate routes.

The flowchart shown in FIG. 7 represents a process for determining the appropriate route on which the vehicle 4 is travelling when the map matching navigation system is operating as a flexible navigator. The vehicle state information is determined by the sensor 10 and the navigator 12 in step 70. The vehicle state information is utilized by the map route processor 65 in step 71 to retrieve data regarding candidate routes 9. In step 72, the correlator 63 of the map matching navigation system computes a matched point 28 on each link 34 from the candidate routes 9. Next, the correlator 63 calculates the deviation distance 36 for each matched point 28 in step 73 and the correlation characteristics corresponding to each matched point in step 74.

The map route processor 65 in step 75 compares the correlation characteristic of each candidate route 9 to a maximum correlation characteristic. The other candidate routes 9 are discarded in step 76 if the correlation characteristic of one route exceeds the maximum correlation characteristic and the map matching navigation system may update the vehicle location data in step 77.

All candidate routes 9 are compared to a minimum correlation characteristic in step 78. All candidate routes 9 having a correlation characteristic below the minimum value are discarded in step 79. The map matching navigation system in step 80 will continue to track candidate routes 9 having a correlation characteristic above the minimum correlation characteristic. In step 81, the map matching navigation system updates the measured point with the matched point through the utilization of map matching techniques in accordance with the present invention to correct error within the system.

The map matching navigation system continues to monitor the vehicle state information in order to identify the particular route of travel after the correction error is determined.

The map matching navigation system may also operate as a fixed navigator wherein the vehicle 4 travels on a predetermined map route 8 inputted via the user interface 18 by the vehicle operator. When the vehicle 4 makes a turn the map matching navigation system merely searches for a corresponding turn in the predetermined map route 8 and may update the vehicle location.

Figure 8:
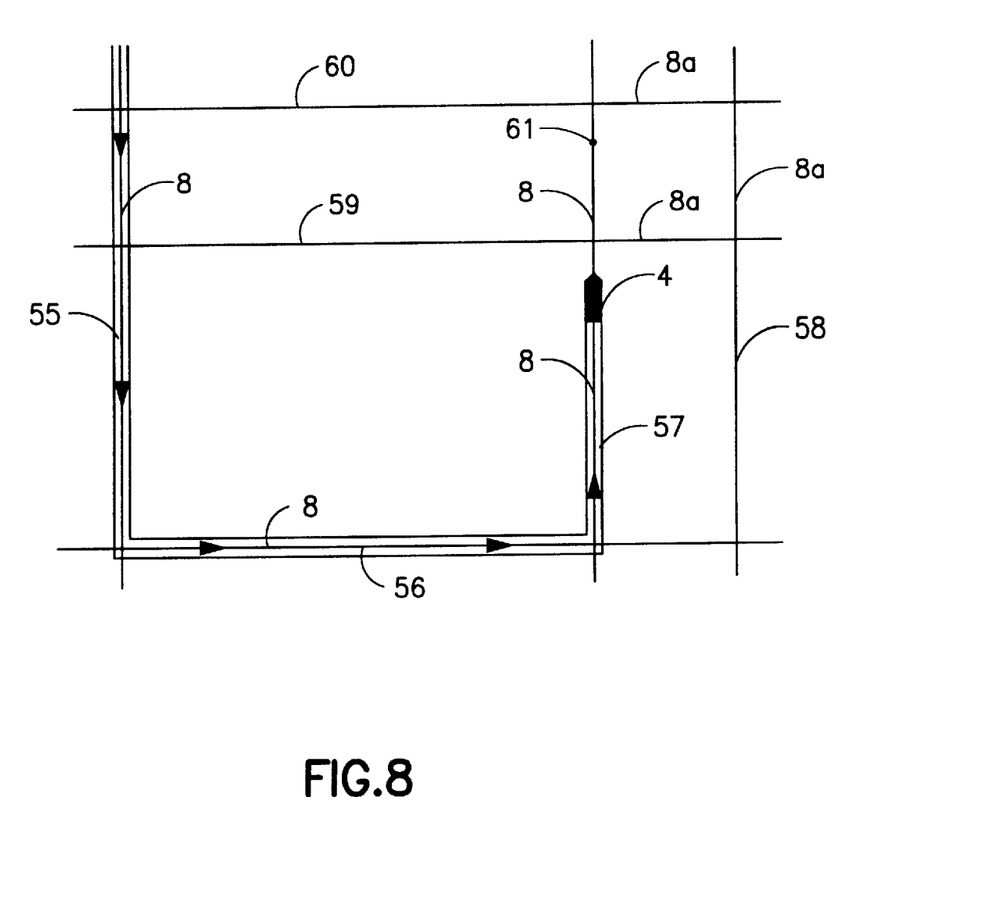
FIG. 8 is a schematic diagram of a portion of a predetermined map route.

The map matching navigation system operating as a fixed navigator accommodates errors in the map database 14. Referring to FIG. 8, the actual distance between a first road 55 and a third road 57 is 540 meters. However, assume the distance recorded between the first road 55 and third road 57 in the map database 14 is 520 meters and the distance between the third road 57 and a fourth road 58 is 20 meters.

As shown in FIG. 8, the map route 8 follows the first road 55 to a left hand turn onto a second road 56 and a left hand turn onto the third road 57. When the vehicle 4 makes a left hand turn from the second road 56 to the third road 57 the correlation characteristic may drop below a threshold value because the vehicle 4 did not turn left after traveling 520 meters.

The map matching navigation system operating in the fixed navigator mode may query the driver via the user interface 18 whether the vehicle 4 has deviated from the predetermined map route 8 after the correlation characteristic drops below a threshold value. The driver may respond via the user interface 18 that they are still on the predetermined map route 8 and the map matching navigation system will correctly resume tracking the vehicle 4 on the third road 57 corresponding to the left hand turn from the second road 56.

The map matching navigation system operating in the flexible mode under this scenario would show the vehicle 4 erroneously travelling on the fourth road 58 and the map matching navigation system would have to be reinitialized.

Again referring to FIG. 8, assume the proper distance is recorded between the first road 55 and the third road 57 and the map matching navigation system properly tracks the vehicle 4 along the third road 57. However, the third road 57 is unexpectedly closed at a detour point 61 and the driver turns right onto a fifth road 59, left onto the fourth road 58, left onto a sixth road 60 and right onto the third road 57.

Operating as a fixed navigator, the map matching navigation system may query the driver via the user interface 18 to indicate whether they deviated from the predetermined map route 8 because the correlation characteristic may drop below the threshold value when the vehicle 4 turned right onto the fifth road 59. The driver would indicate via the user interface 18 that they deviated from the predetermined map route 8. The map matching navigation system would then operate as a flexible navigator to track the vehicle 4 after the vehicle 4 deviated from the predetermined map route 8. The map matching navigation system would automatically return to the fixed mode after the vehicle 4 returns to the predetermined map route 8.

The central control facility 24 may continuously track the location of the vehicle 4 as previously described. A dispatcher at the central control facility 24, if aware of the detour point 61, could download an altered predetermined map route 8a around the detour point 61 to the vehicle 4 via the first transceiver 22 and a second transceiver 23. The map matching navigation system would then track the vehicle 4 on the altered predetermined map route 8 without querying the driver.

Curves within the map database are approximated by a plurality of shaping nodes 32 and plurality of links 34 within a curve link sequence as shown in FIG. 1. The shaping nodes 32 and links 34 may be tracked in the same manner as nodes and links 34 within the straight portions of the map route 8. However, additional information is processed when the vehicle 4 encounters a turn. In particular, the last key node 30 of a turn provides a position with a high confidence level. The analyzer 64 of the map matching navigation system may utilize the end of the turn as an update point for updating the vehicle position and reducing accumulated error.

Therefore, the map matching navigation system may be configured to determine whether the vehicle 4 is located within a turn or a straight portion of the actual route 6. The map matching navigation system may calculate a yaw angle deviation between the most recent measured point 26 and the map route 8 by the following equation to determine whether the vehicle 4 is located within a turn and wherein Ψ is the yaw angle of the measured location and $\Psi_{map}$ is the yaw angle of the map link:

$$\Delta \Psi_{straight} = \begin{cases} \psi - \psi_{map}, & \text{if } |\psi - \psi_{map}| < \pi \\ \psi - \psi_{map} + 2\pi, & \text{if } \psi - \psi_{map} < -\pi \\ \psi - \psi_{map} - 2\pi, & \text{if } \psi - \psi_{map} > \pi \end{cases}$$

The vehicle 4 should be making a turn if the absolute calculated heading deviation |ΔΨ| exceeds a predetermined threshold value (e.g. 5 degrees, 10 degrees). Otherwise, the vehicle 4 should be travelling on a straight segment.

The end point of a turn may be used to update the vehicle location on the map route 8 with a high level of confidence. Therefore, the end point of a turn should be calculated if the vehicle 4 is currently travelling in the turn.

One method of determining the end point of the turn is to calculate $\Delta\Psi_1$ and $\Delta\Psi_2$ according to the following equations:

$$\Delta\Psi_1 = \Psi_1 - \Psi_{start}$$

$$\Delta\Psi_2 = \Psi_2 - \Psi_{end}$$

In particular, $\Psi_1$ is the yaw angle of a measured point 26 at time t1=0 (when a turn is first detected), $\Psi_2$ is the yaw angle of a measured point 26 at time t2>t1, $\Psi_{start}$ is the yaw angle for the start node of the turn, and $\Psi_{end}$ is the yaw angle for the end node of a turn.

The vehicle 4 should have finished the turn if both the absolute value of $\Delta\Psi_1$ is less than or equal to a predetermined threshold value and the absolute value of $\Delta\Psi_2$ is less than or equal to a predetermined threshold value.

An update is performed by the analyzer 64 when it is determined that a turn has been completed. Specifically, the next matched point 28 will be located at the last key node 30 of the curve instead of using a matched point 28. Precisely updating the measured point 26 and matched point 28 on the map route 8 at the end of a curve eliminates accumulated error within the map matching navigation system. The vehicle location is updated at the end of a curve because the position of the vehicle 4 is known with a high degree of certainty.

During the working phase of the system, the current link 35 and node information are determined according to vehicle state information and the map database 14 and retrieved from the map database 14. The correlator 63 of the map matching navigation system determines whether a matched point 28 is located on a current link 35 or on a connected link 34 whenever a new group of measurement data is entered from the sensor 10. The matched point 28 may be calculated directly if it is located on the current link 35. Otherwise, the map matching navigation system will search the connected links 34 by the following method to determine the location of the corresponding matched point 28 of a measured point 26.

Figure 9:
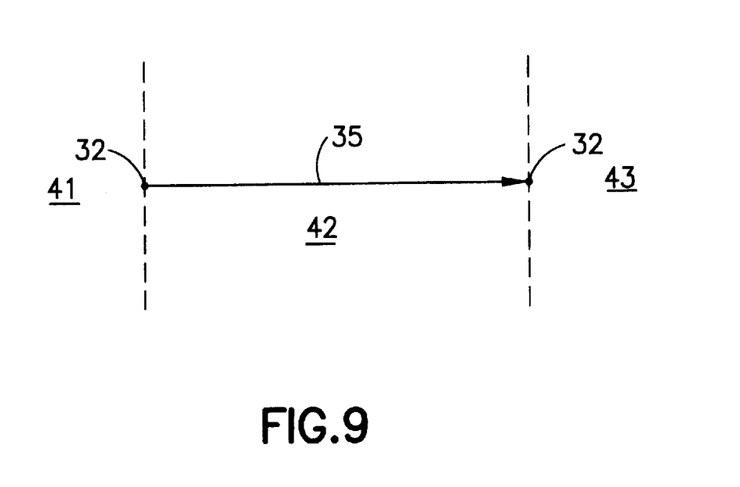
FIG. 9 is a schematic diagram of a single link defined by two nodes.

Two scaler parameters $\lambda_1$ and $\lambda_2$ indicate the relative position of a matched point 28 on the current link 35 and are defined by the following equations:

$$\lambda_1 = \frac{(y_{i+1} - y_i)(y_{i+1} - y_{in}) - (x_i - x_{i+1})(x_{i+1} - x_{in})}{(y_{i+1} - y_i)^2 + (x_i - x_{i+1})^2}$$

$$\lambda_2 = \frac{(y_{i+1} - y_i)(y_{in} - y_i) - (x_i - x_{i+1})(x_{in} - x_i)}{(y_{i+1} - y_i)^2 + (x_i - x_{i+1})^2}$$

The scaler parameters $\lambda_1$ and $\lambda_2$ indicate whether the matched point 28 is on the current link 35 or which side of the current link 35 if the matched point 28 is not on the current link 35. As shown in FIG. 9, the matched point 28 is within a first region 41 if $\lambda_1 > 0$ and $\lambda_2 <= 0$, a second region 42 if $\lambda_1 >= 0$ and $\lambda_2 > 0$, and a third region 43 if $\lambda_1 0$ and $\lambda_2 > 0$.

Figure 10:
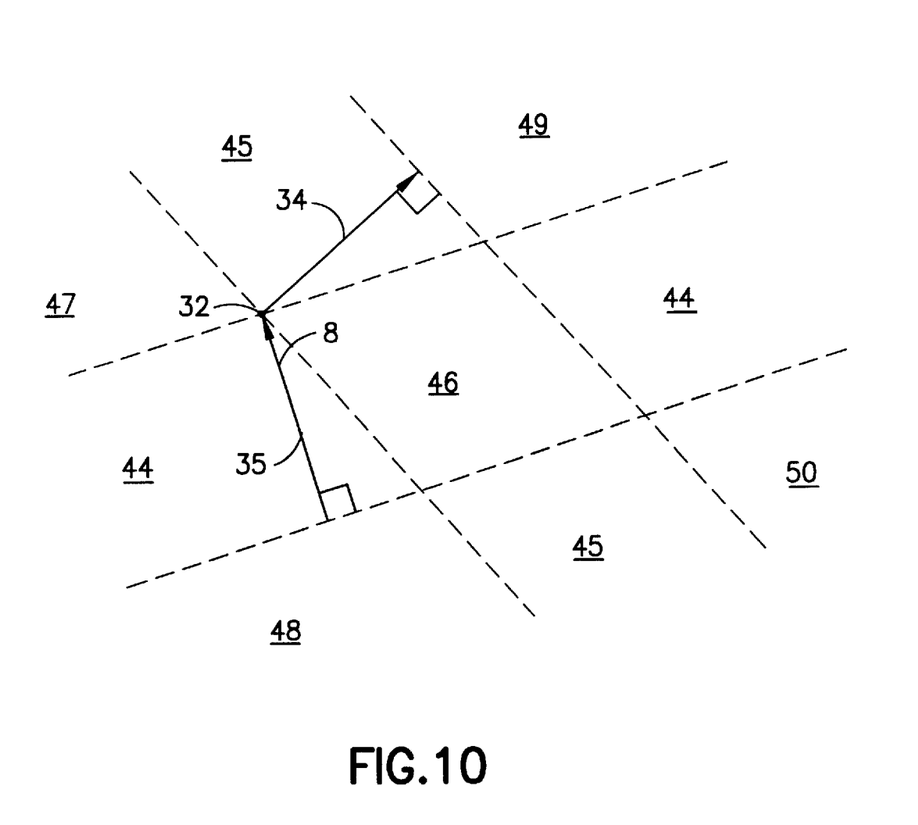
FIG. 10 is a schematic diagram of two links having different headings.

The current link 35 determination is more complex if there is a heading change between two successive links as shown in FIG. 10. First, four scaler parameters must be analyzed $\lambda_{11}$, $\lambda_{12}$, $\lambda_{21}$ and $\lambda_{22}$. $\lambda_{11}$ and $\lambda_{12}$ pertain to the current link 35 and $\lambda_{21}$ and $\lambda_{22}$ pertain to a connected link 34.

The matched point 28 is within a fourth region 44 and located on a current link 35 if:

$$\left\{ \begin{array}{l} \lambda_{11} \geq 0 \\ \lambda_{22} \geq 0 \end{array} \right. \& \left\{ \begin{array}{l} \lambda_{21} < 0 \\ \text{or } \lambda_{22} < 0 \end{array} \right.$$

The matched point 28 is within a fifth region 45 and located on a following link 34 if:

$$\left\{ \begin{array}{l} \lambda_{21} > 0 \\ \lambda_{22} \geq 0 \end{array} \right. \& \left\{ \begin{array}{l} \lambda_{11} < 0 \\ \text{or } \lambda_{12} < 0 \end{array} \right.$$

The matched point 28 is within a sixth region 46 and may be on the current link 35 or the following link 34 if:

$$\left\{ \begin{array}{l} \lambda_{11} \geq 0 \\ \lambda_{12} \geq 0 \end{array} \right. \& \left\{ \begin{array}{l} \lambda_{21} \geq 0 \\ \lambda_{22} \geq 0 \end{array} \right.$$

The matched point 28 is located on the link closer to the measured point.

The matched point 28 is within a seventh region 47 and located at a next shaping node 32 if:

$$\lambda_{11} < 0 \ \& \ \lambda_{22} < 0$$

The matched point 28 is within an eighth region 48 and located before the current link 35 if:

$$\lambda_{11} < 0 \ \& \ \lambda_{21} < 0$$

The map matching navigation system should track the scaler parameters for a previous link (not shown) and the current link 35.

The matched point 28 is within a ninth region 49 and located after the following link 34 if:

$$\lambda_{12} < 0 \ \& \ \lambda_{22} < 0$$

The map matching navigation system should track the scaler parameters for the following link 34 and a next link (not shown).

The matched point 28 is within an ambiguous region 50 if:

$$\lambda_{12} < 0 \ \& \ \lambda_{21} < 0$$

The matched point 28 will be determined from the previous matched point.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims and all equivalents thereof.

We claim:

1. A map matching navigation system to determine a location of a vehicle on a map route, comprising:
   a. a sensor to measure at least one vehicle state characteristic;
   b. a navigator coupled with said sensor to determine a measured point of the vehicle based upon the at least one vehicle state characteristic;
   c. a map database including a plurality of links and a plurality of nodes to define the map route;
   d. a correlator coupled with said navigator and said map database to determine a matched point of the vehicle on the map route which corresponds to the measured point; and
   e. an analyzer coupled with said correlator to detect an end of a curve in the map route and updating the measured point and the matched point to the end of the curve.

2. The map matching navigation system of claim 1 further comprising an user interface coupled with said analyzer to convey the map route and the matched point to an user.

3. The map matching navigation system of claim 1 further comprising a computer readable memory to store a predetermined map route.

4. The map matching navigation system of claim 1 wherein said analyzer updates the measured point and the matched point to a node at the end of the curve.

5. The map matching navigation system of claim 4 wherein said navigator, said correlator, and said analyzer are implemented in a central processor.

6. The map matching navigation system of claim 1 further comprising a map route processor coupled with said correlator and said map database and said analyzer, and said map route processor computes at least one statistical parameter from a deviation distance between the measured point and the matched point to determine the map route from the measured point.

7. The map matching navigation system of claim 6 wherein the analyzer updates the measured point and the matched point to a node at the end of the curve.

8. The map matching navigation system of claim 7 further comprising an user interface coupled with said analyzer to convey the map route and the matched point to an user.

9. The map matching navigation system of claim 8 wherein said map route processor computes at least one statistical parameter from the measured point and the matched point to determine the map route.

10. The map matching navigation system of claim 1 wherein the matched point is the most probable point on the map route which corresponds to the measured point.

11. The map matching navigation system of claim 1 wherein said sensor determines a travelling distance and a travelling direction of the vehicle.

12. The map matching navigation system of claim 1 further comprising at least one of a plurality of tags and a global position system to initialize the location of the vehicle.

13. A method of locating a vehicle on a map route, comprising:
   a. measuring at least one vehicle state characteristic;
   b. computing a measured point of the vehicle based upon the at least one vehicle state characteristic;
   c. correlating the measured point to a matched point on the map route;
   d. searching the map route for a curve therein which exceeds a predetermined threshold;
   e. updating the measured point and matched point to a point corresponding to the end of the curve; and
   f. displaying the map route and the matched point thereon.

14. The method of claim 13 further comprising a step before said step (c) of inputting a predetermined map route.

15. The method of claim 13 further comprising a step after said step (c) of confirming the map route.

16. The method of claim 13 further comprising a step after said step (c) of computing at least one statistical parameter from a deviation distance between the measured point and the matched point.

17. The method of claim 16 further comprising a step after said step (c) of calculating a correlation characteristic from the at least one statistical parameter.

18. The method of claim 17 further comprising a step after said step (c) of confirming the map route from the correlation characteristic.

19. The method of claim 13 wherein the at least one vehicle state characteristic is measured by at least one of a dead reckoning system, an inertial navigation system and a global positioning system.

20. The method of claim 13 further comprising a step before step (a) of initializing an initial vehicle location.

21. The method of claim 20 wherein said intializing includes manually inputting the initial vehicle location via a user interface.

22. The method of claim 20 wherein said intializing includes automatically inputting intialization information via at least one of a tag receiver and an absolute positioning system.

23. A map matching navigation system to determine a location of a vehicle on a map route, comprising:
   a. a navigator to determine a measured point of the vehicle;
   b. a map database including a plurality of map routes;
   c. a correlator coupled with said navigator and said map database to determine at least one matched point of the vehicle on a plurality of candidate routes and each of the at least one matched point corresponds to the measured point;
   d. a map route processor coupled with said correlator and said map database, said map route processor calculating at least one statistical parameter from a deviation distance between said at least one measured point and said at least one matched point to determine the map route from a plurality of candidate routes; and
   e. an analyzer coupled with said correlator and said map route processor to detect an end of a curve in the map route and update the measured point and the matched point to the end of the curve.

24. The map matching navigation system of claim 23 wherein said map route processor calculates a correlation characteristic for said at least on statistical parameter and confirms a map route from said plurality of candidate routes using said correlation characteristic.

25. The map matching navigation system of claim 24 wherein said map route processor identifies the map route from the candidate routes and the map route has a correlation characteristic within a preselected range.

26. A map matching navigation system to determine a location of a vehicle on a map route, comprising:
   a. a navigator to determine a measured point of the vehicle;
   b. a map database including a plurality of map routes;
   c. a correlator coupled with said navigator and said map database to determine at least one matched point of the vehicle on a plurality of candidate routes and each of the at least one matched point corresponds to the measured point;
   d. a map route processor coupled with said correlator and said map database, said map route processor calculating at least one statistical parameter from a deviation distance between said at least one measured point and said at least one matched point to determine the map route from a plurality of candidate routes,
   said map route processor calculating a correlation characteristic for said at least on statistical parameter and confirms a map route from said plurality of candidate routes using said correlation characteristic,
   said map route processor identifying the map route from the candidate routes and the map route has a correlation characteristic within a preselected range; and
   e. an analyzer coupled with said correlator and said map route processor to detect an end of a curve in the map route and update the measured point and the matched point to the end of the curve.

* * * * *